(12) United States Patent
Kim

(10) Patent No.: US 9,866,663 B2
(45) Date of Patent: Jan. 9, 2018

(54) CASE HAVING STANDING LEG FOR ELECTRONIC DEVICES

(71) Applicant: SPIGEN KOREA CO, LTD., Seoul (KR)

(72) Inventor: Dae-Young Kim, Seoul (KR)

(73) Assignee: SPIGEN KOREA CO., LTD., Geum Cheon-Gu, Seoul (KR)

( * ) Notice: Subject to any disclaimer, the term of this patent is extended or adjusted under 35 U.S.C. 154(b) by 0 days.

(21) Appl. No.: 15/063,429

(22) Filed: Mar. 7, 2016

(65) Prior Publication Data

US 2016/0269516 A1 Sep. 15, 2016

Related U.S. Application Data

(60) Provisional application No. 62/131,709, filed on Mar. 11, 2015.

(51) Int. Cl.
| | |
|---|---|
| *A47G 1/24* | (2006.01) |
| *H04M 1/04* | (2006.01) |
| *H04B 1/3888* | (2015.01) |
| *H04M 1/18* | (2006.01) |

(52) U.S. Cl.
CPC ............ *H04M 1/04* (2013.01); *H04B 1/3888* (2013.01); *H04M 1/185* (2013.01)

(58) Field of Classification Search
CPC ........ H04M 1/04; H04M 1/185; H04M 1/021; H04B 1/3888; A45C 2011/002; A45F 2200/0516; F16M 11/10; F16M 2200/00; F16M 2200/022; F16M 11/2021

USPC .............. 248/454–457, 469, 463; 455/575.8; 40/748, 753
See application file for complete search history.

(56) References Cited

U.S. PATENT DOCUMENTS

| | | | |
|---|---|---|---|
| 4,528,230 A † | 7/1985 | Larson | |
| 6,149,749 A † | 11/2000 | McBroom | |
| 7,301,759 B2* | 11/2007 | Hsiung | H05K 5/0234 248/188 |
| 8,442,604 B1* | 5/2013 | Diebel | G03B 17/02 361/679.32 |
| 8,936,229 B2* | 1/2015 | Zhu | H04M 1/04 248/688 |
| 8,983,559 B2* | 3/2015 | Chiu | H04M 1/185 379/433.11 |
| 9,185,954 B2* | 11/2015 | Cheung | F16M 11/10 |

(Continued)

*Primary Examiner* — Christopher E Garft
(74) *Attorney, Agent, or Firm* — Lucem, PC; Heedong Chae

(57) ABSTRACT

A case for an electronic device includes a protective cover having a base member for covering a back portion of the electronic device and a side member for covering a side portion of the electronic device; a pivot opening formed on the base member wherein the pivot opening has a pair of end grooves formed on an inner surface of the base member; and a standing leg (or a kickstand) having a pair of projections. The projections are respectively mounted on and received in the end grooves. The standing leg has a body portion and a pivot portion and a standing leg recess is formed on the outer surface of the base member for receiving the body portion of the standing leg therein. The case further includes a sticker for being attached to the inner surface of the base member to cover the pivot opening.

20 Claims, 17 Drawing Sheets

(56) References Cited

U.S. PATENT DOCUMENTS

| | | | |
|---|---|---|---|
| 9,300,346 B2* | 3/2016 | Hirsch | H04B 1/385 |
| 9,301,584 B2* | 4/2016 | Butts | A45C 11/00 |
| 9,407,743 B1* | 8/2016 | Hirshberg | H04M 1/04 |
| 2009/0017883 A1† | 1/2009 | Lin | |
| 2010/0059649 A1* | 3/2010 | Buxton | F16M 13/00 |
| | | | 248/371 |
| 2010/0142130 A1* | 6/2010 | Wang | F16M 13/00 |
| | | | 361/679.01 |
| 2010/0309617 A1* | 12/2010 | Wang | F16M 11/10 |
| | | | 361/679.01 |
| 2011/0049005 A1* | 3/2011 | Wilson | A45C 11/00 |
| | | | 206/701 |
| 2011/0089307 A1* | 4/2011 | Brooks | A46B 15/0085 |
| | | | 248/469 |
| 2011/0309728 A1* | 12/2011 | Diebel | H04B 1/3888 |
| | | | 312/293.1 |
| 2013/0120911 A1* | 5/2013 | Chou | H04M 1/0283 |
| | | | 361/679.01 |
| 2013/0206612 A1* | 8/2013 | Chun | A47G 1/24 |
| | | | 206/38 |
| 2014/0262854 A1* | 9/2014 | Chen | A45C 11/00 |
| | | | 206/45.24 |
| 2015/0143648 A1* | 5/2015 | Batey | A45C 11/00 |
| | | | 15/104.93 |
| 2015/0162767 A1* | 6/2015 | Oh | H02J 7/0044 |
| | | | 320/108 |
| 2015/0180524 A1* | 6/2015 | Lambert | H04M 1/04 |
| | | | 455/575.1 |
| 2015/0244408 A1* | 8/2015 | Chen | H04B 1/3888 |
| | | | 455/575.8 |

* cited by examiner
† cited by third party

CASE HAVING STANDING LEG FOR ELECTRONIC DEVICES

CROSS-REFERENCE TO RELATED APPLICATIONS

This application claims priority to U.S. provisional patent application No. 62/131,709 filed Mar. 11, 2015, which is incorporated herein by reference.

FIELD OF THE INVENTION

The present invention relates to a case having a standing leg for an electronic device and, more particularly, to a smart phone case having a standing leg for propping up the smart phone case.

BACKGROUND OF THE INVENTION

Mobile electronic devices such as mobile phones, smart phones, tablet computers and the like are in wide use around the world. A user grips such device in his hand or hands to use it and uses his fingers to use various applications of the device. However, while using the device, the user may accidentally drop the device thereby causing damage to the device. In addition, use of mobile electronic devices may cause hand, limb and back problems due to the physical stress of holding the electronic device for an extended period of time.

Users of the mobile electronic devices use cases to protect their devices and manufacturers have produced different types of cases to help the users keep their mobile devices safe. However, certain of these cases do not allow a user to prop up the mobile device for hands-free viewing at a comfortable angle. Even if such function is allowed, the propping up structure is often complicated and inconvenient.

Therefore, to solve the above problems, there is a need for a case having an easy-to-use standing leg for an electronic device constructed in a simple and durable structure. This invention is directed to solve these problems and satisfy the long-felt need.

SUMMARY OF THE INVENTION

The present invention contrives to solve the disadvantages of the prior art. The present invention provides a case having a standing leg for an electronic device such as a mobile phone, smart phone, tablet computer and the like, and, more particularly, to a standing leg pivoted with the soft protective case of the case.

The object of the present invention is to provide a case, including: a protective cover having a base member for covering a back portion of the electronic device and a side member for covering a side portion of the electronic device wherein the base member has an inner surface and an outer surface; a pivot opening formed on the base member wherein the pivot opening has a pair of end grooves formed on the inner surface of the base member; and a standing leg (kickstand) having a pair of projections. The projections are respectively, mounted on, received in, and pivot in the end grooves and the standing leg is pivoted relative to the base member.

Another object of the present invention is to provide a case, having: a protective cover; a pivot opening formed on the base member of the protective cover; and a standing leg (or a kickstand) having a pair of projections. The pair of projections are respectively, mounted on, received in, and pivoted in a pair of the end grooves of the pivot opening. The standing leg has a body portion and a pivot portion and a standing leg recess is formed on the outer surface of the base member for receiving the body portion of the standing leg therein.

Still another object of the present invention is to provide a case, further including a sticker for being attached to the inner surface of the base member to cover the pivot opening. The sticker has a sticker body and an adhesive layer.

The advantages of the present invention are: (1) the case of the present invention has a simple, stylish structure of a standing leg for propping up the case; (2) the standing leg is easy-to-use and convenient; (3) the sticker to cover the pivot opening prevents damages or scratch to an electronic device by the standing leg; (4) the sticker is received in the sticker recess for the sticker to be substantially flush or co-planar with the inner surface of the base member; (5) the standing leg is more durable and less vulnerable to scratches or damages because the standing leg is securely received in the standing leg recess; (6) once a mobile phone is received and secured in the case, the standing leg is very securely pivoted and the opening and closing of the standing leg is very convenient; (7) the soft protective cover and standing leg are very easy to assemble and the standing leg is easy to be replaced; (8) the surface of the standing leg is flush with the surface of the soft protective frame and the appearance and finish are stylish; and (9) the standing leg can be opened conveniently by using a fingernail and the operation is easy.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
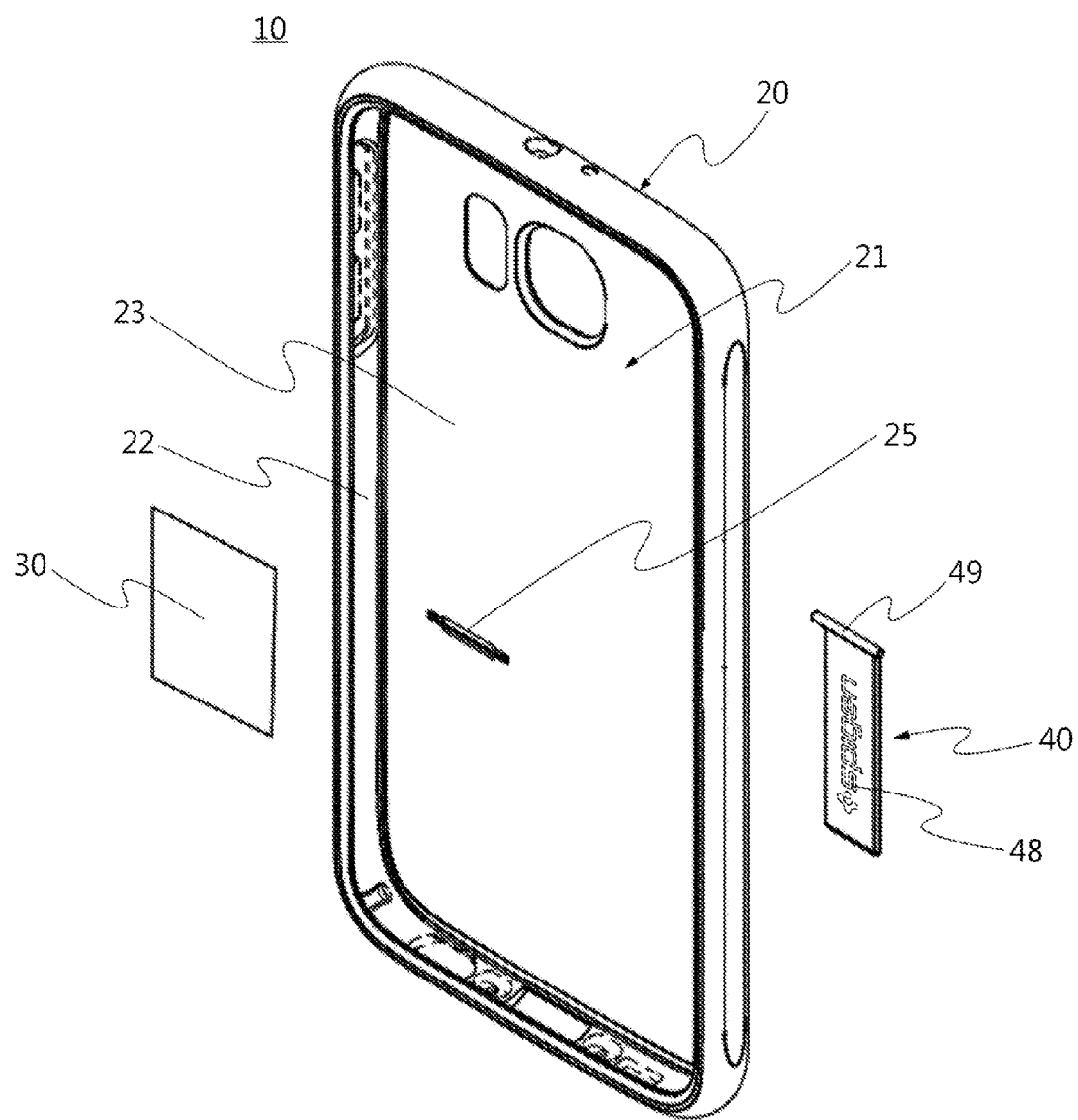
FIG. 1 shows an exploded front perspective view of a case having a standing leg according to one embodiment of the present invention.
Figure 2:
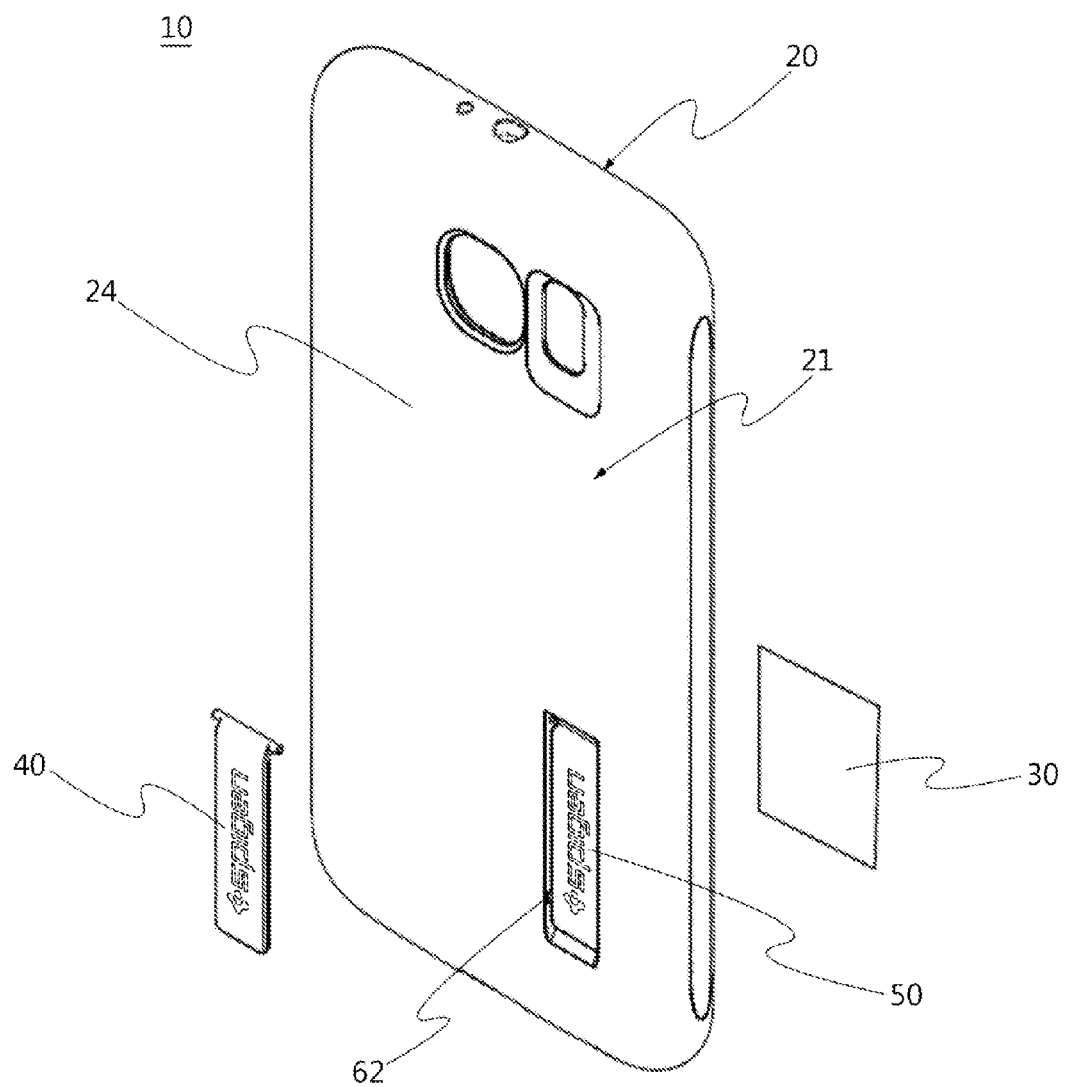
FIG. 2 shows an exploded rear perspective view of a case.
Figure 3:
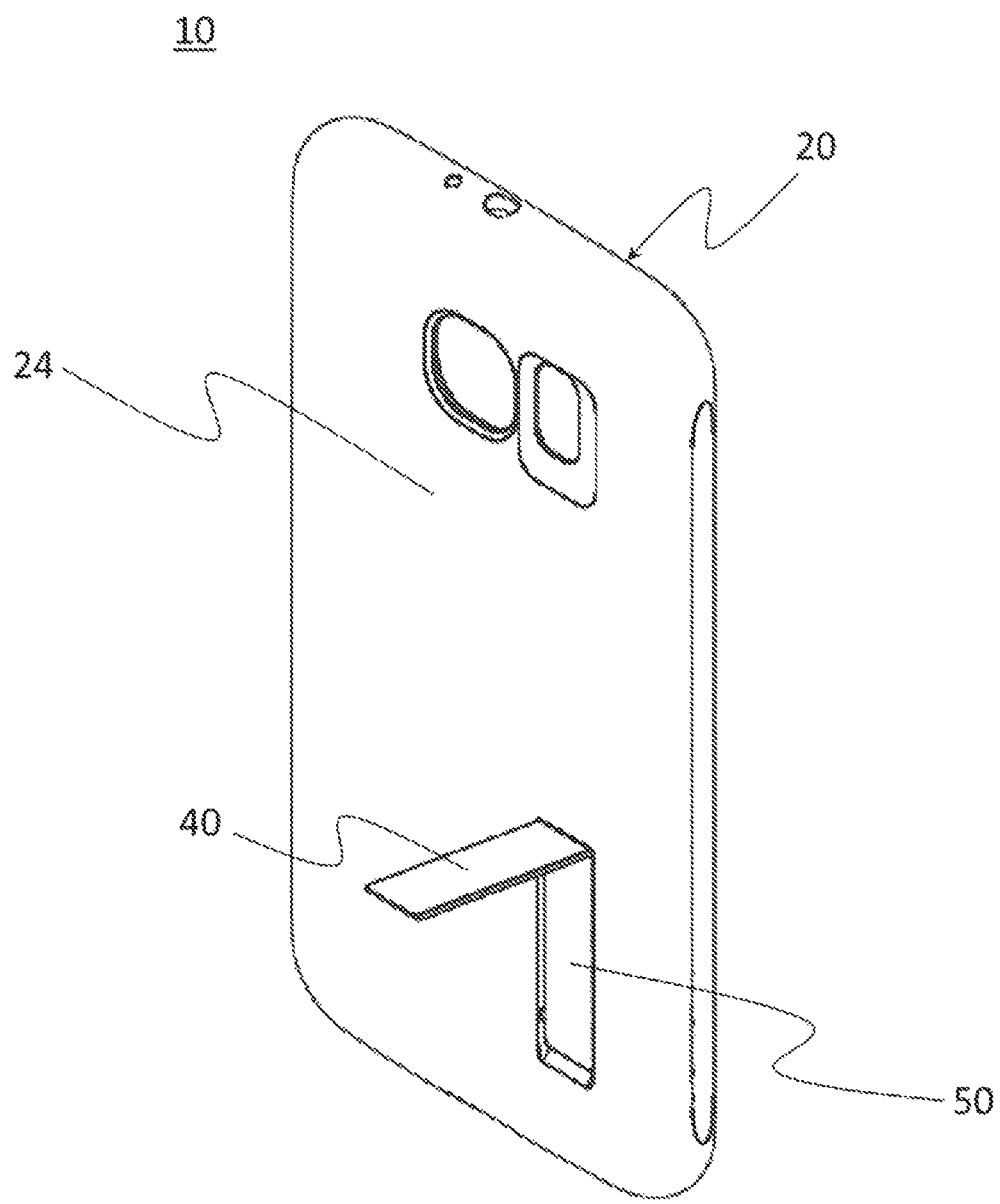
FIG. 3 shows a rear perspective view of the case with the standing leg in an open position.

FIGS. 1 and 2 respectively show front and rear exploded perspective views of a case 10 having a standing leg or kickstand 40 according to one embodiment of the present invention. FIG. 3 shows a rear perspective view of the case 10 with the standing leg 40 in an open position.

The case 10, having a standing leg 40, for an electronic device (now shown), comprises: a protective cover 20 having a base member 21 for substantially covering a back portion of the electronic device (not shown) and a side member 22 for covering a side portion of the electronic device (not shown) wherein the base member 21 has an inner surface 23 and an outer surface 24; a pivot opening 25 formed on the base member 21 wherein the pivot opening 25 has a pair of end grooves 27 formed on the inner surface 23 of the base member 21; and a standing leg 40 having a pair of projections 45. Preferably, the side member 22 extends from the base member 21 along the outer boundary of the base member 21. The side member 22 and the base member 21 may have apertures for various function keys, connectors, camera, etc. necessary to effectively use the device.

In other words, the soft protective cover 20 substantially covers the entire electronic device (not shown) except for the screen side or front portion and providing cutout portions to allow for access to certain portions of the electronic device such as a camera lens, various ports, switches, and the like.

The projections 45 are respectively mounted on and received in the end grooves 27 so that the projections 45 pivot in the end grooves 21 and the standing leg 40 is pivoted relative to the base member 21. Thus, the projections 45 act as a hinge for the standing leg 40. Furthermore, the standing leg 40 can be easily replaced should it get damaged or worn down in the future.

When the standing leg 40 is in an open position, the case 10 props up the electronic device on a flat surface at a preferred viewing angle.

The standing leg 40 has a body portion 48 and a pivot portion 49 and a standing leg recess 50 is formed on the outer surface 24 of the base member 21 for receiving the body portion 48 of the standing leg 40 therein. In a closed position of the standing leg 40, the standing leg 40 is received by the standing leg recess 50.

The standing leg recess 50 is sized to receive the standing leg 40. The standing leg 40 is rotatable from a closed position in which it is received in the standing leg recess 50 to an open position in which the standing leg 40 is rotated about the predetermined angle 80 so that the electronic device may rest on a surface at a preferred viewing angle.

Figure 4:
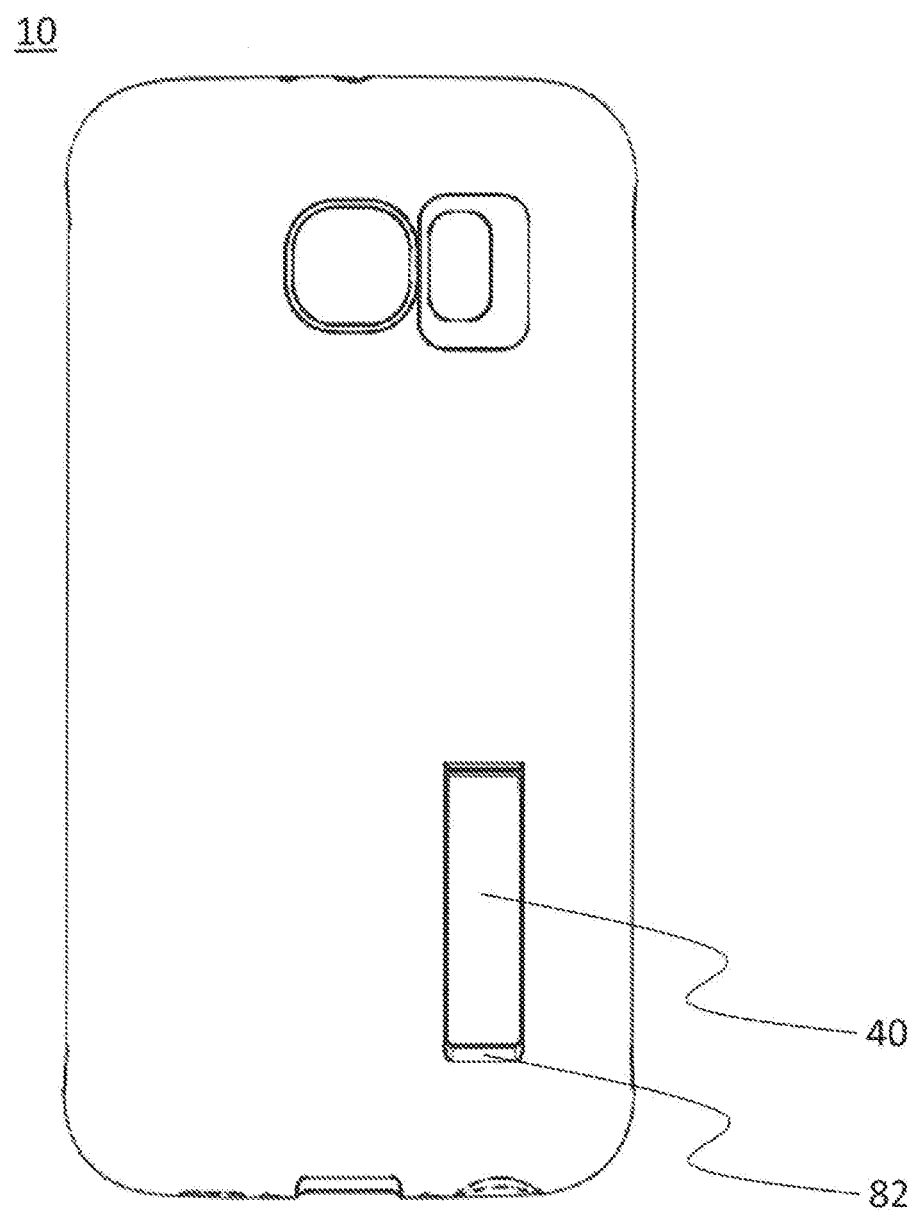
FIG. 4 shows a rear view of the case.
Figure 6:
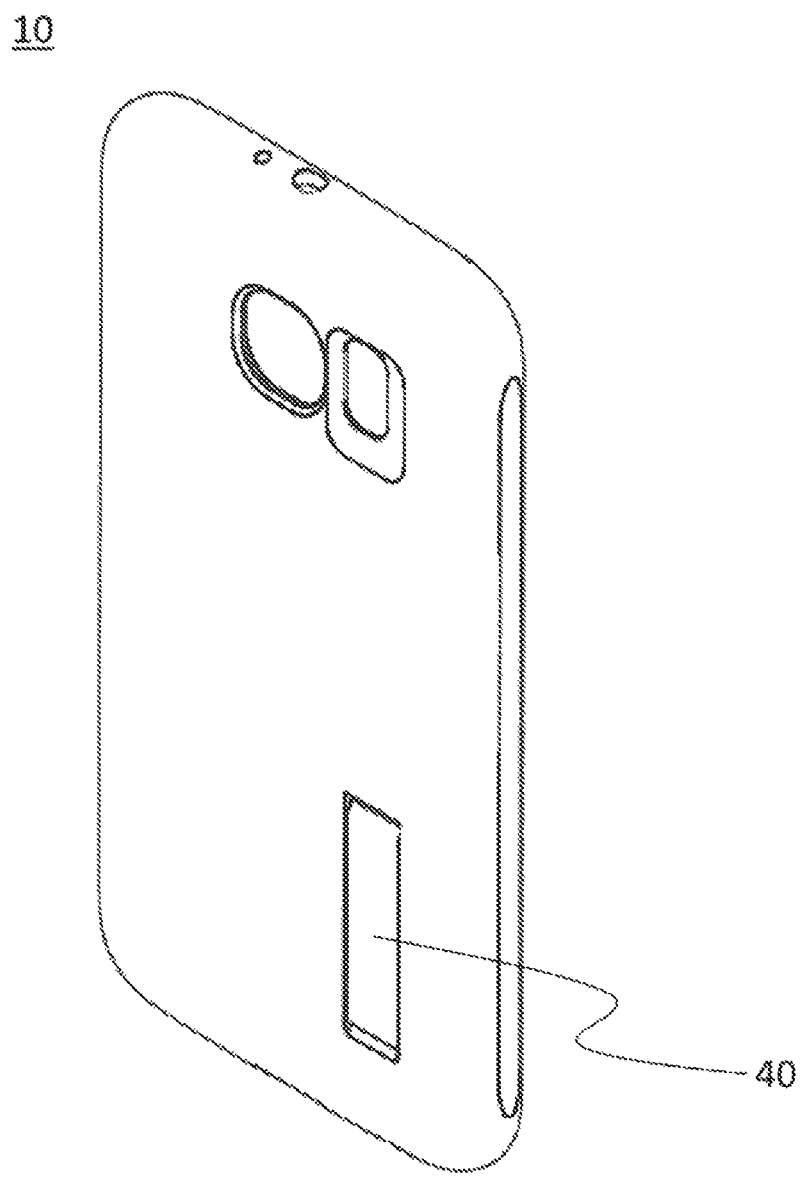
FIG. 6 shows a rear perspective view of the case with the standing leg in a closed position.

As shown in FIGS. 4 and 6, the body portion 48 of the standing leg 40 is substantially flush or co-planar with the outer surface 24 of the base member 21 when the standing leg 40 is in a closed position.

Figure 7:
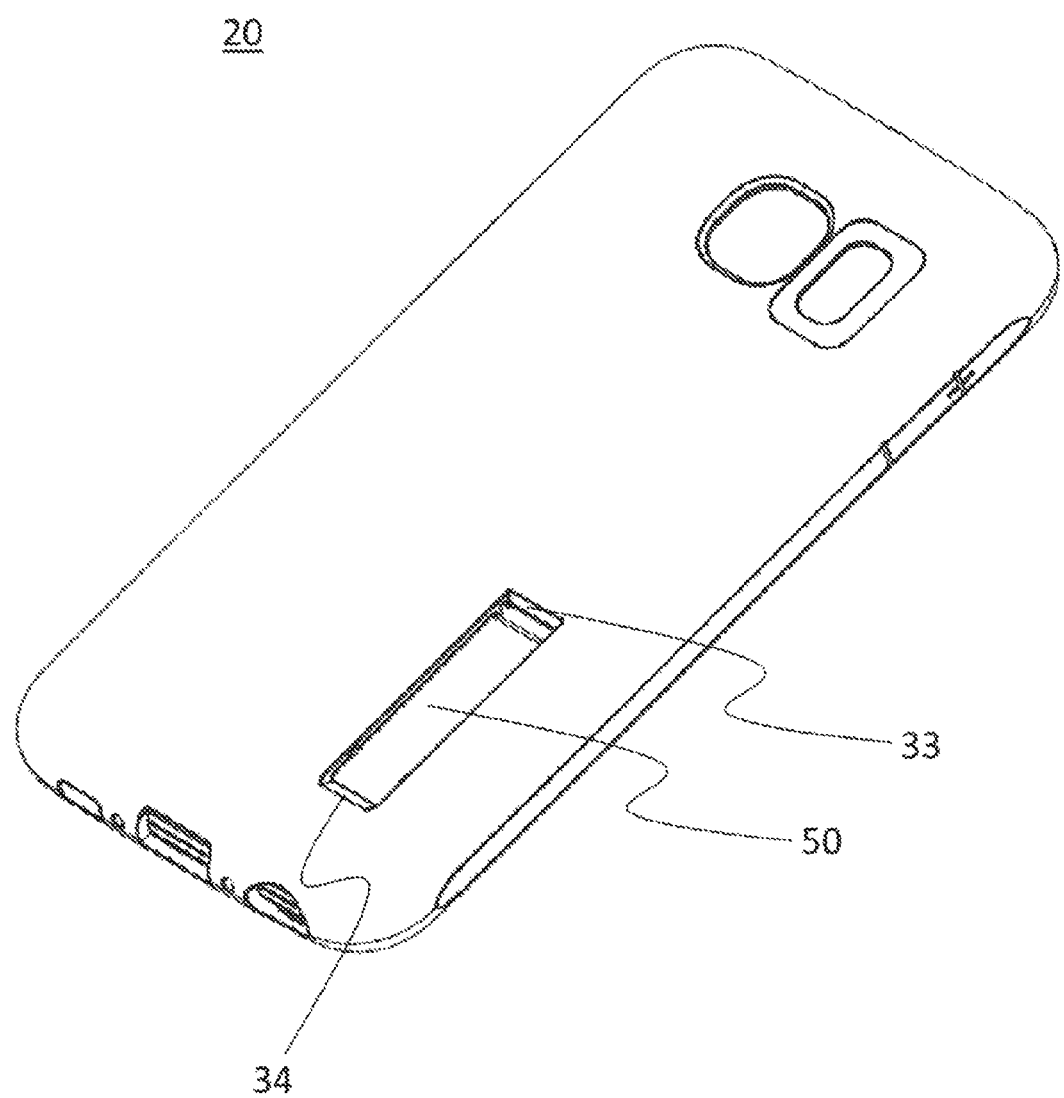
FIG. 7 shows a rear perspective view of the soft protective cover.

As shown in FIG. 7, an emblem, a trademark, a slogan, or an insignia may be formed on the standing leg recess 50.

Figure 5:
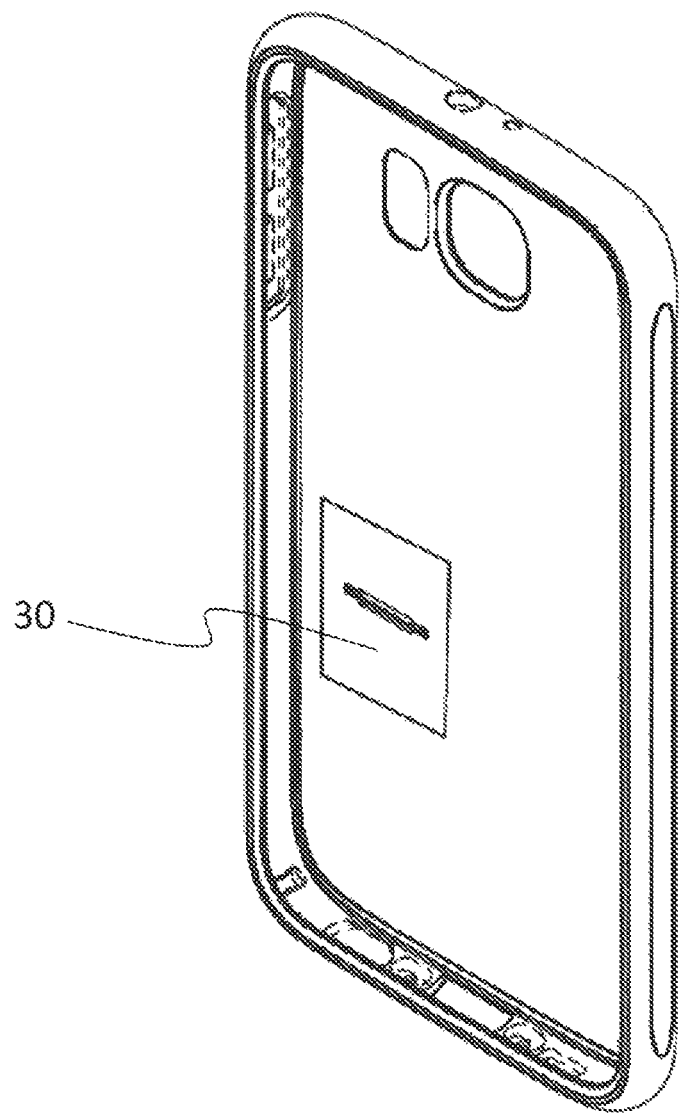
FIG. 5 shows a front perspective view of the case.

FIG. 4 shows a rear view of the case 10. FIG. 5 shows a front perspective view of the case 10 and FIG. 6 shows a rear perspective view of the case 10 with the standing leg 40 in a closed position;

The case 10 may further comprise a sticker 30 for being attached to the inner surface 23 of the base member 21 to cover the pivot opening 25. The sticker 30 may have a sticker body and an adhesive layer (not shown). The adhesive layer attaches the sticker 30 to the inner surface 23 of the base member 21. The location of the sticker 30 corresponding to the pivot opening 25 may not have the adhesive layer.

The sticker body may be made of urethane, PVC (polyvinyl chloride), polyethylene teraphthalate (PET), polycarbonate (PC), or metal. In addition, a sticker recess 35 may be formed on the inner surface 23 of the base member 21 for receiving the sticker 30 therein. The sticker 30 can be substantially flush or co-planar with the inner surface 23 of the base member 21 because the sticker 30 is received in the sticker recess 35.

Accordingly, the sticker 30 covers the pivot opening 25 and the electronic device mounted on the protective cover 20 is in contact with the sticker 30 to help the projections 45 of the standing leg 40 securely rest in the end grooves 27 for pivot rotation of the standing leg 40.

Figure 10:
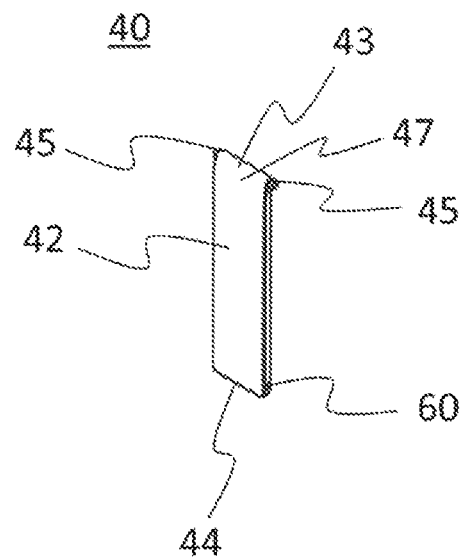
FIG. 10 shows a rear perspective view of the standing leg.
Figure 11:
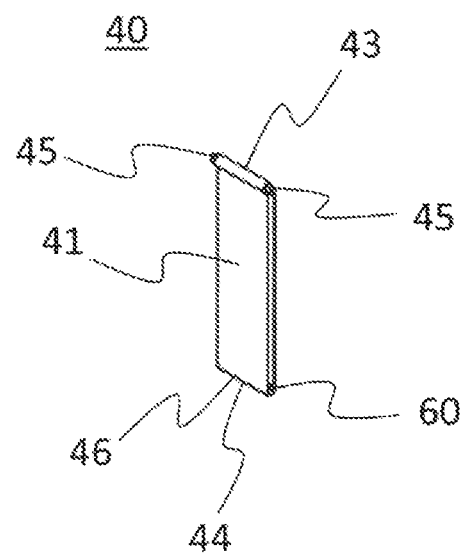
FIG. 11 shows a front perspective view of the standing leg.

FIGS. 10 and 11 respectively show rear and front perspective views of the standing leg 40. In addition, FIG. 7 shows a rear perspective view of the soft protective cover 20.

The standing leg 40 comprises a pivoting end 43 and a distal end 44 and the projections 45 are formed on both ends of the pivoting end 43 wherein the pivoting end 43 is received in the pivot opening 25. Here, the pivoting end 43 includes the projections 45 and the pivot opening 25 includes the end grooves 27.

The standing leg 40 is configured to rotate up to about a predetermined angle 80 until a contact part 47 of the standing leg 40 contacts a pivoting end wall 33 of the pivot opening 25.

The contact part 47 of the standing leg 40 is sloped and the pivoting end wall 33 of the pivot opening 35 is sloped such that the contact part 47 is in planar contact with the pivoting end wall 33 when the standing leg 40 is rotated about the predetermined angle 80. Because of the planar contact, the standing leg 40 cannot rotate beyond the predetermined angle 80. Such planar contact provides wider contact area than linear or point contact, and thus, scratch or damage to the standing leg 40 or the pivoting end wall 33 can be minimized. In addition, the pivoting end wall 33 can provide stable and reliable support to the standing leg 40 in an open position. In addition, by adjusting the slopes of the pivoting end wall 33 and the contact part 47, the predetermined angle 80 can be adjusted.

Figure 15:
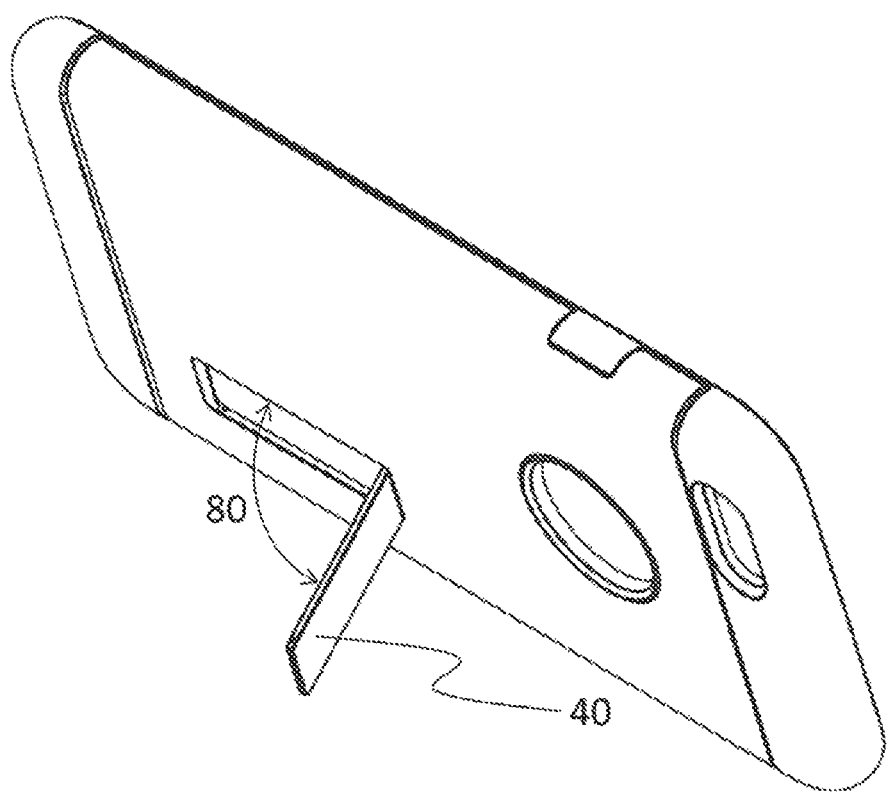
FIG. 15 shows a rear perspective view of the case with the standing leg in an open position according to another embodiment of the present invention.

As shown in FIG. 3 or FIG. 15, the standing leg 40 may be configured to be installed on the protective cover 20 parallel to a length direction of the protective cover 20 and the predetermined angle 80 may be more than 90 degrees.

Figure 16:
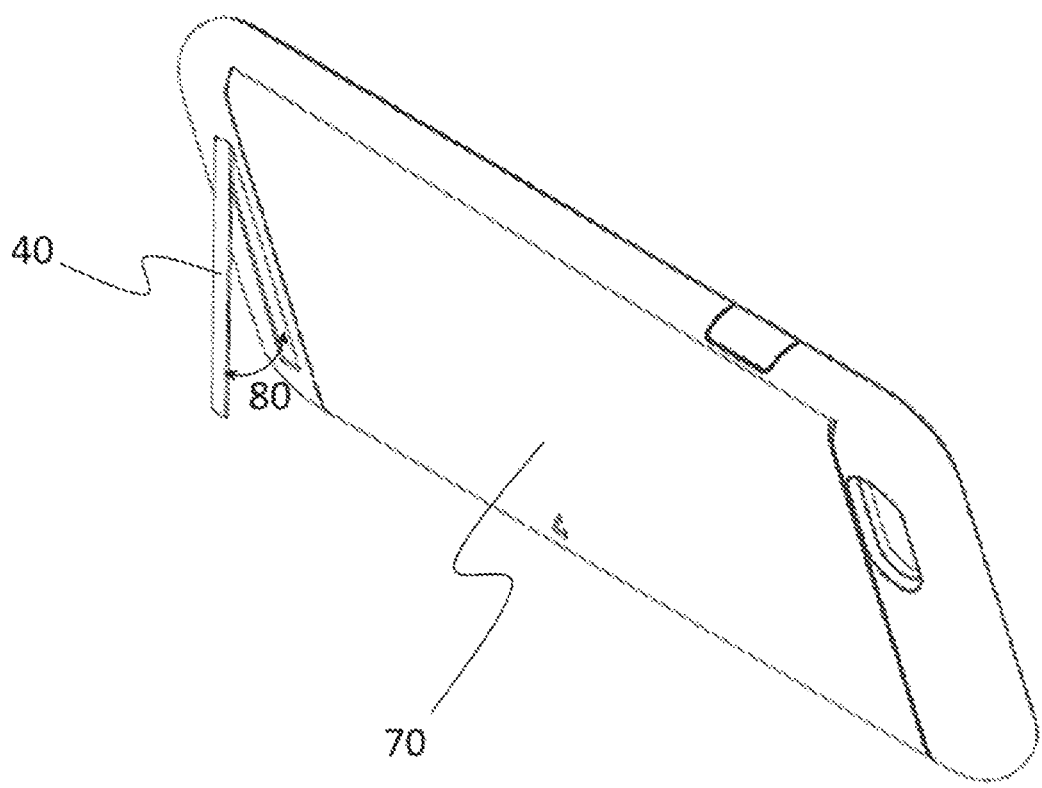
FIG. 16 shows a rear perspective view of the case with the standing leg in an open position according to still another embodiment of the present invention.
Figure 17:
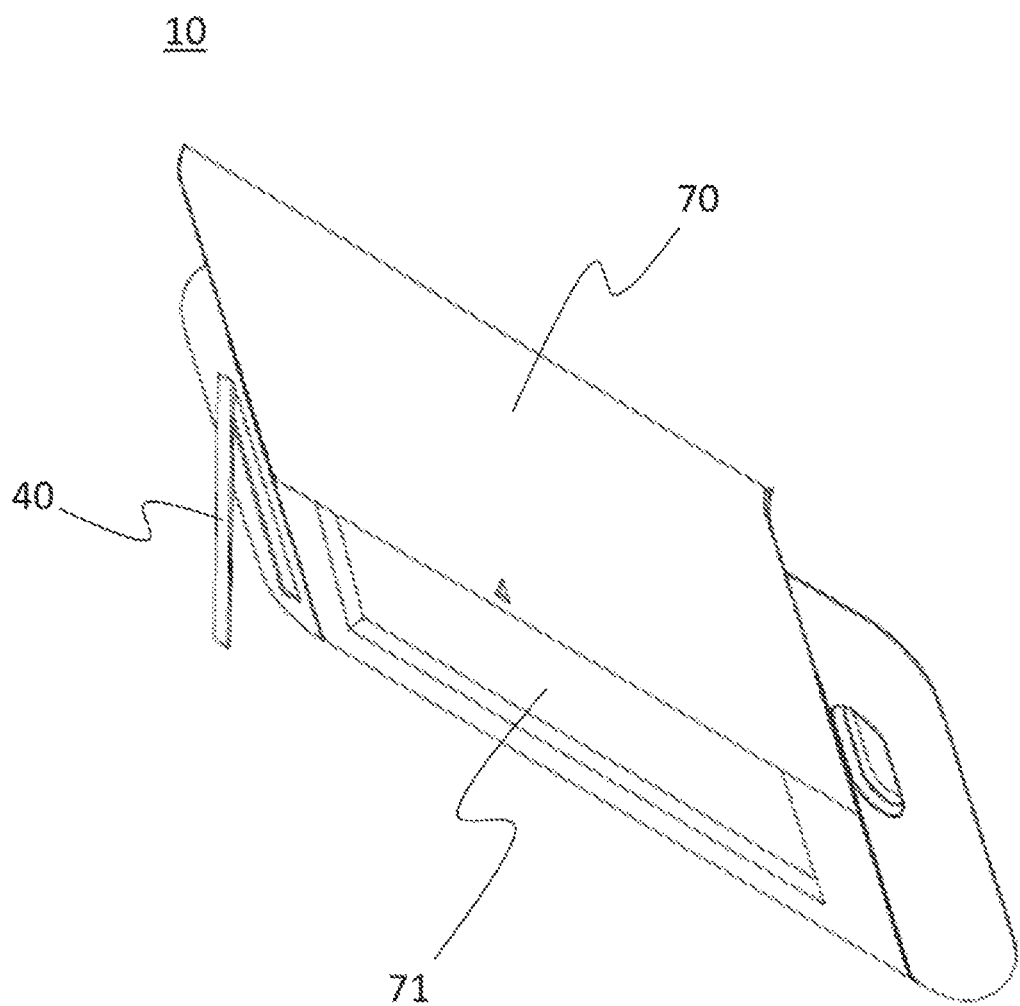
FIG. 17 shows another rear perspective view of the case in FIG. 16 with the cover open.
Figure 18:
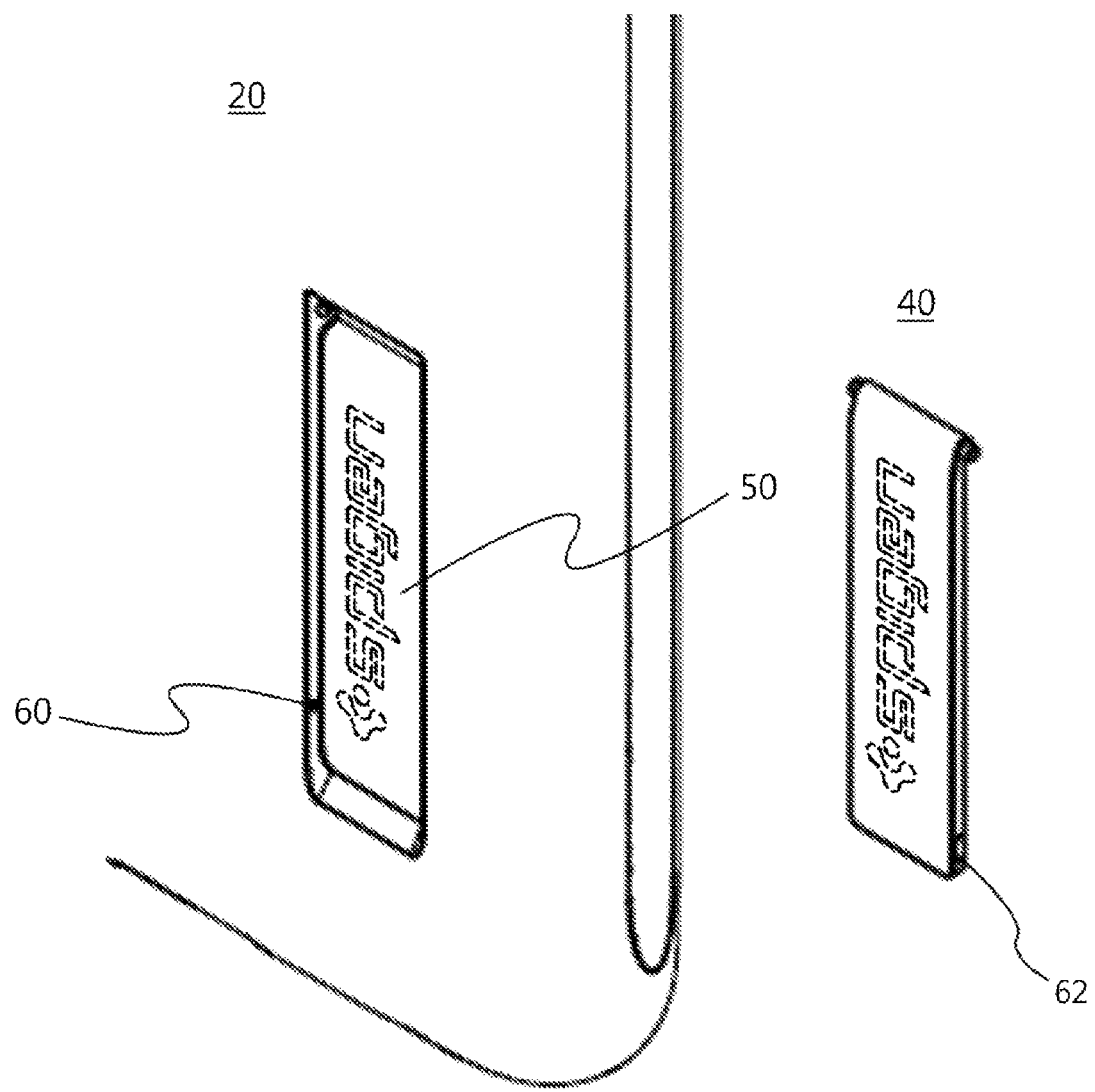
FIG. 18 shows an enlarged exploded rear perspective view of the case and the standing leg according to another embodiment of the invention.

Alternatively, as shown in FIGS. 16 and 17, the standing leg 40 may be configured to be installed on the protective cover 20 parallel to a width direction of the protective cover 20 and the predetermined angle 80 may be smaller than 90 degrees.

When the standing leg or kickstand 40 props up an electronic device in an open position, the standing leg 40 stays in an open position by the weight of the electronic device and/or the case 10.

A mating protrusion 60 may be formed on the standing leg 40 and a mating cavity 62 may be formed on the standing leg recess 50 wherein the mating protrusion 60 is adapted to be mated with the mating cavity 62. Alternatively, a mating protrusion 60 may be formed on the standing leg recess 50 and a mating cavity 62 may be formed on the standing leg 40 wherein the mating protrusion 60 is adapted to be mated with the mating cavity 62. The mating between the mating protrusion 60 and the mating cavity 62 locks the standing leg 40 to the standing leg recess 50 so that the standing leg 40 is in a closed position unless forced open by a user.

A distal end wall 34 of a standing leg recess 40 may be sloped and there may be a gap 82 between the distal end wall 34 of the standing leg recess 40 and a distal end 44 of the standing leg 40 for easy insertion of a user's fingernail into the gap 82 to open the standing leg 40.

A recess or slope 46 may be formed on the distal end 44 of the standing leg 40 for easy insertion of a user's fingernail into the gap 82 to open the standing leg 40.

An emblem, a trademark, a slogan, or an insignia may be formed on an inner surface 41 of the standing leg 40. Additionally, an emblem, a trademark, a slogan, or an insignia may be formed on an outer surface 42 of the standing leg 40.

The protective cover 20 is preferably made of soft material. More preferably, the protective cover 20 may be made of thermoplastic polyurethane.

In addition, the standing leg 40 may be made of hard material and more preferably, polycarbonate.

FIGS. 16 and 17 show a cover 70 and a credit card storage space 71 to store a credit card or other items.

Figure 8:
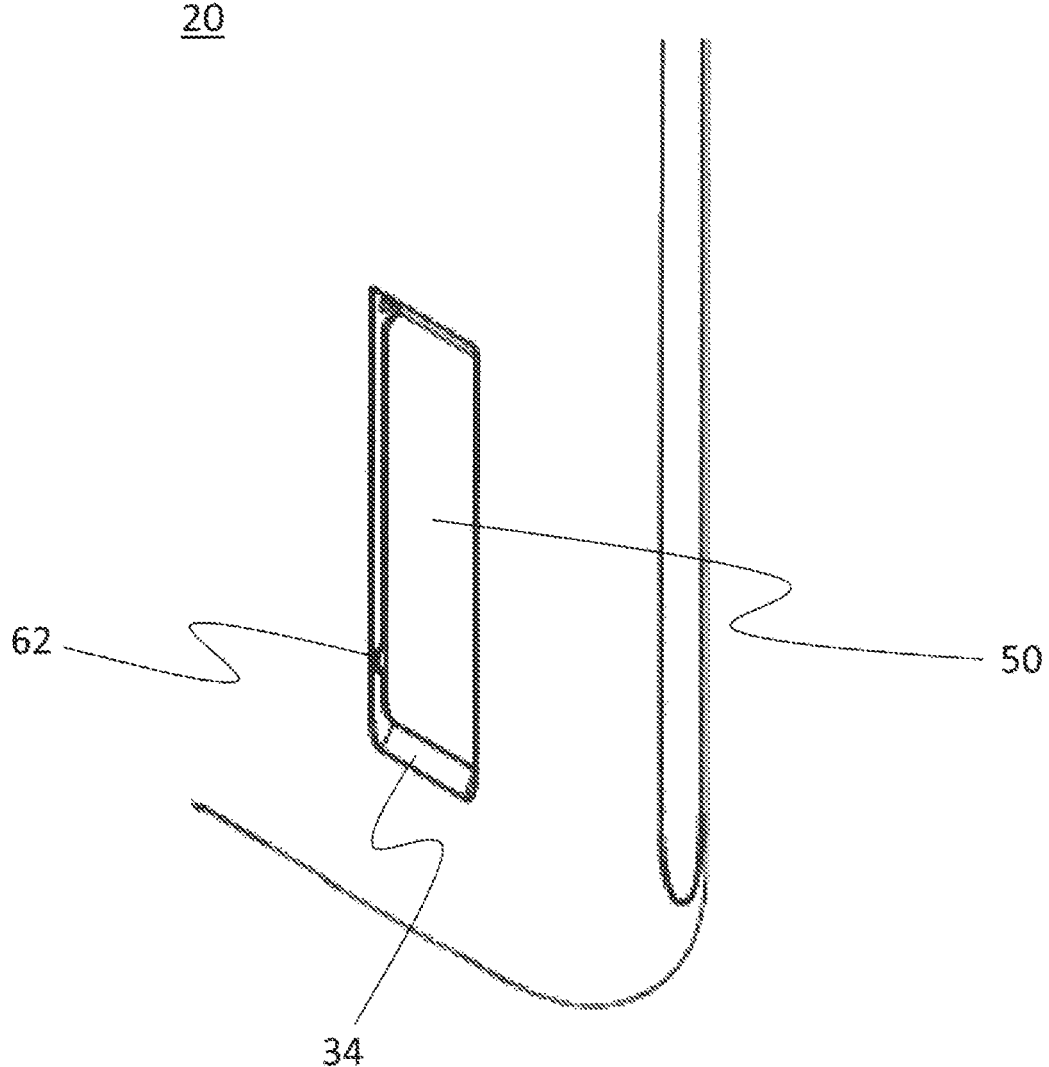
FIG. 8 shows an enlarged rear perspective view of the soft protective cover.
Figure 9:
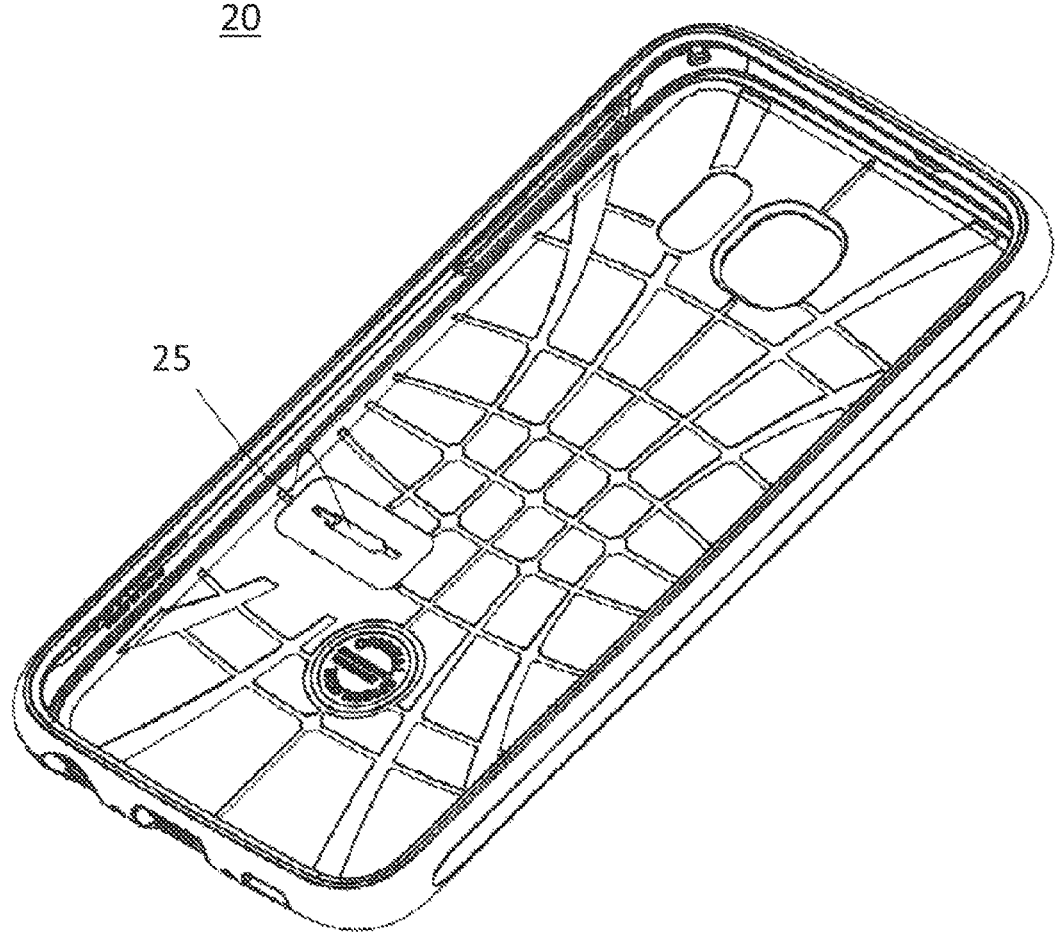
FIG. 9 shows a front perspective view of the soft protective cover.
Figure 12:
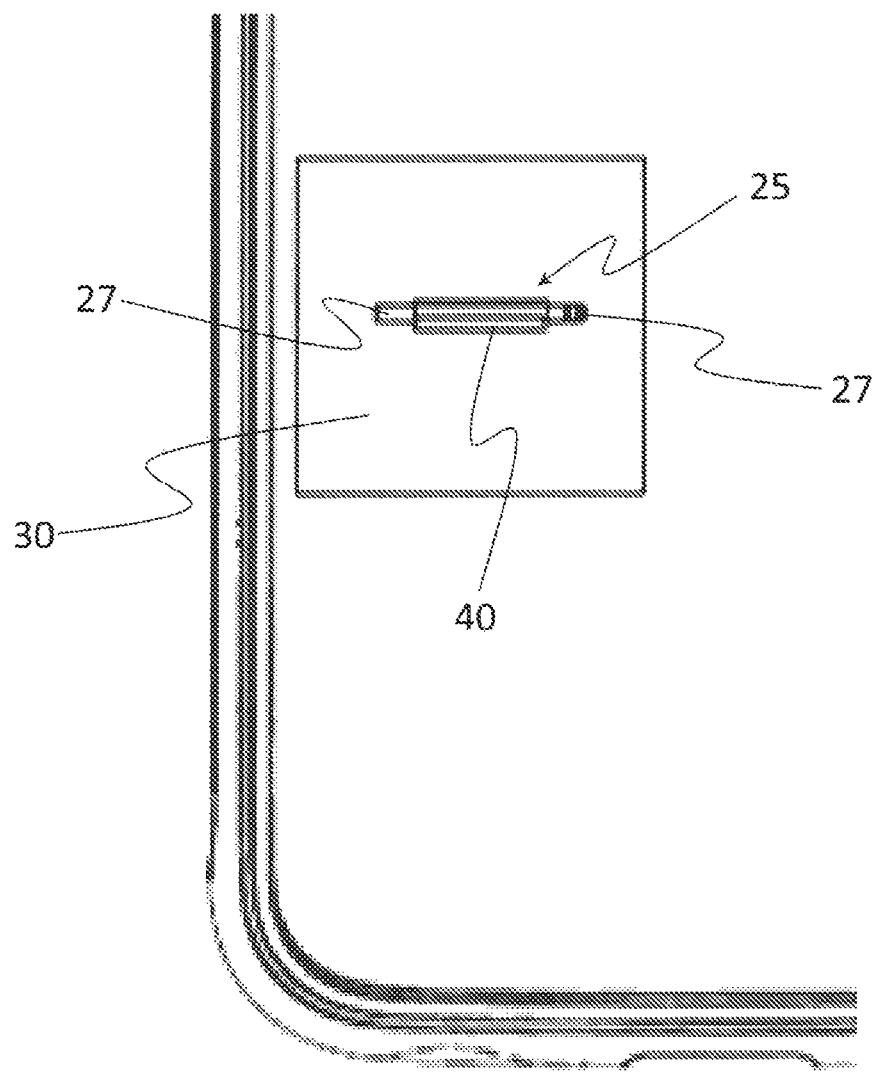
FIG. 12 shows an enlarged front view of the soft protective cover.
Figure 13:
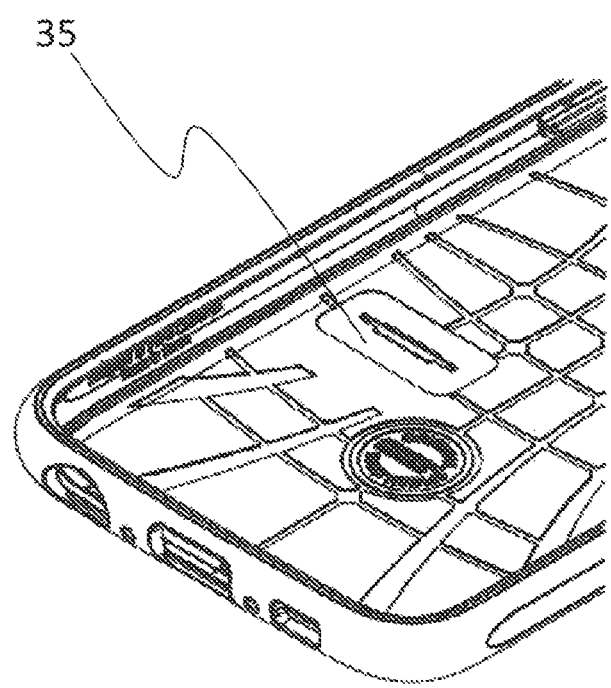
FIG. 13 shows a front perspective view of the case illustrating the sticker recess.
Figure 14:
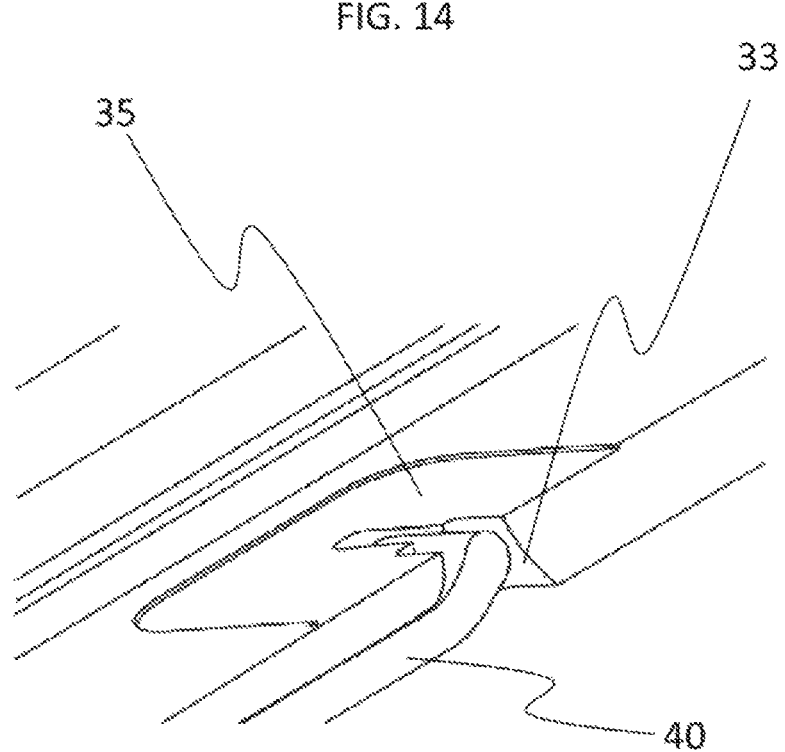
FIG. 14 shows an enlarged cross-sectional view of the case.

FIGS. 8 and 9 respectively show an enlarged rear perspective view and a front perspective view of the soft protective cover 20. FIG. 12 shows an enlarged front view of the soft protective cover 20 and FIG. 13 shows a front perspective view of the case 10 illustrating the sticker recess 35. In addition, FIG. 14 shows an enlarged cross-sectional view of the case 10.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case (10), having a standing leg (40), for an electronic device, comprising:

a protective cover (20) having a base member (21) for substantially covering a back portion of the electronic device and a side member (22) for covering a side portion of the electronic device wherein the base member (21) has an inner surface (23) and an outer surface (24);

a pivot opening (25) formed on the base member (21) wherein the pivot opening (25) has a pair of end grooves (27) formed on the inner surface (23) of the base member (21);

the standing leg (40) having a pair of projections (45) wherein the projections (45) are respectively mounted on and received in the end grooves (27), and a sticker (30) which is attached to the inner surface (23) of the base member (21) to cover the pivot opening (25) and the projections (45) received in the end grooves (27), wherein the sticker (30) has a sticker body and an adhesive layer, wherein the standing leg can be removed from the case and replaced, wherein the standing leg (40) pivots by the projections (45) about the end grooves (27) and the sticker (30), wherein the pivot opening (25) is a slot.

2. The case (10) of claim 1, wherein the standing leg (40) has a body portion (48) and a pivot portion (49), and a standing leg recess (50) is formed on the outer surface (24) of the base member (21) for receiving the body portion (48) of the standing leg (40) therein.

3. The case (10) of claim 2, wherein the body portion (48) of the standing leg (40) is substantially flush or co-planar with the outer surface (24) of the base member (21) when the standing leg (40) is in a closed position.

4. The case (10) of claim 2, wherein an emblem, a trademark, a slogan, or an insignia is formed on the standing leg recess (50).

5. The case (10) of claim 1, wherein the sticker body is made of urethane, PVC (polyvinyl chloride), polyethylene teraphthalate (PET), polycarbonate (PC), or metal.

6. The case (10) of claim 1, wherein a sticker recess (35) is formed on the inner surface (23) of the base member (21) for receiving the sticker (30) therein.

7. The case (10) of claim 1, wherein the standing leg (40) comprises a pivoting end (43) and a distal end (44) and the projections (45) are formed on opposite ends of the pivoting end (43) wherein the pivoting end (43) is received in the pivot opening (25).

8. The case (10) of claim 7, wherein the standing leg (40) is configured to rotate up to about a predetermined angle (80) until a contact part (47) of the standing leg (40) contacts a pivoting end wall (33) of the pivot opening (25).

9. The case (10) of claim 8, wherein the contact part (47) of the standing leg (40) is sloped and the pivoting end wall (33) of the pivot opening (25) is sloped such that the contact part (47) is in planar contact with the pivoting end wall (33) when the standing leg (40) is rotated about the predetermined angle (80).

10. The case (10) of claim 8, wherein the standing leg (40) is configured to be installed on the protective cover (20) parallel to a length direction of the protective cover (20) and the predetermined angle (80) is more than 90 degrees.

11. The case (10) of claim 8, wherein the standing leg (40) is configured to be installed on the protective cover (20) parallel to a width direction of the protective cover (20) and the predetermined angle (80) is smaller than 90 degrees.

12. The case (10) of claim 7, wherein a mating protrusion (60) is formed on the standing leg (40) and a mating cavity (62) is formed on a standing leg recess (50) wherein the mating protrusion (60) is adapted to be mated with the mating cavity (62).

13. The case (10) of claim 7, wherein a mating protrusion (60) is formed on a standing leg recess (50) and a mating cavity (62) is formed on the standing leg (40) wherein the mating protrusion (60) is adapted to be mated with the mating cavity (62).

14. The case (10) of claim 7, wherein a distal end wall (34) of a standing leg recess (40) is sloped and there is a gap (82) between the distal end wall (34) of the standing leg recess (40) and a distal end (44) of the standing leg (40) for easy insertion of a user's fingernail into the gap (82) to open the standing leg (40).

15. The case (10) of claim 14, wherein a recess or a slope (46) is formed on the distal end (44) of the standing leg (40) for easy insertion of a user's fingernail into the gap (82) to open the standing leg (40).

16. The case (10) of claim 1, wherein an emblem, a trademark, a slogan, or an insignia is formed on an inner surface (41) of the standing leg (40).

17. The case (10) of claim 1, wherein an emblem, a trademark, a slogan, or an insignia is formed on an outer surface (42) of the standing leg (40).

18. The case (10) of claim 1, wherein the protective cover (20) is made of soft material.

19. The case (10) of claim 1, wherein the protective cover (20) is made of thermoplastic polyurethane.

20. The case (10) of claim 2, wherein the body portion (48) of the standing leg (40) is sized to pass through the pivot opening (25).

* * * * *